United States Patent
Bayyouk et al.

(10) Patent No.: US 11,473,686 B2
(45) Date of Patent: Oct. 18, 2022

(54) CLADDED VALVE SEAT, ASSEMBLY, AND METHODS FOR CLADDING SUCH SEAT

(71) Applicant: SPM Oil & Gas Inc., Fort Worth, TX (US)

(72) Inventors: Jacob A. Bayyouk, Richardson, TX (US); Sozon Tsopanos, Stockport (GB)

(73) Assignee: SPM Oil & Gas Inc., Forth Worth, TX (US)

( * ) Notice: Subject to any disclaimer, the term of this patent is extended or adjusted under 35 U.S.C. 154(b) by 0 days.

(21) Appl. No.: 17/047,043

(22) PCT Filed: Jun. 7, 2019

(86) PCT No.: PCT/US2019/035983
§ 371 (c)(1),
(2) Date: Oct. 12, 2020

(87) PCT Pub. No.: WO2019/236960
PCT Pub. Date: Dec. 12, 2019

(65) Prior Publication Data
US 2021/0190223 A1   Jun. 24, 2021

Related U.S. Application Data

(60) Provisional application No. 62/682,708, filed on Jun. 8, 2018.

(51) Int. Cl.
*F16K 25/00* (2006.01)
*C23C 24/10* (2006.01)
(Continued)

(52) U.S. Cl.
CPC .......... *F16K 25/005* (2013.01); *C23C 24/103* (2013.01); *F04B 53/006* (2013.01);
(Continued)

(58) Field of Classification Search
CPC ........ F16K 25/005; F16K 1/42; F16K 15/063; F04B 53/006; F04B 53/1087; C23C 24/103
See application file for complete search history.

(56) References Cited

U.S. PATENT DOCUMENTS

| 2,101,970 | A | 12/1937 | Wissler |
| 7,726,026 | B1 | 6/2010 | Blume |

(Continued)

OTHER PUBLICATIONS

International Search Report and Written Opinion dated Aug. 19, 2019 for International Patent Application No. PCT/US2019/035983, 17 pages.

*Primary Examiner* — Patrick C Williams
(74) *Attorney, Agent, or Firm* — Foley & Lardner LLP

(57) ABSTRACT

This disclosure provides a valve seat having cladded surfaces of high hardness in order to improve the service life of valve seats. The cladded surfaces may include various materials of favorable mechanical properties for mitigating failure mechanisms known for common valve seats (e.g., having a common base metal throughout). In one example, the cladded surfaces are created using an additive manufacturing process, such as laser metal deposition. The cladded surfaces offer advantages including metallurgical bonding, localized low heat input at the laser focus (thus enabling accurate control of temperature and mitigating undesirable heat treatment effects), ductility in middle layers for increasing impact resistance, variable cladding thickness (optionally exceeding 1 mm), increased hardness by material and fusing temperature selections, corrosion resistance, modification of mechanical properties of the same selected material, and allowing for sensor embedment.

24 Claims, 5 Drawing Sheets

(51) Int. Cl.
*F04B 53/00* (2006.01)
*F04B 53/10* (2006.01)
*F16K 1/42* (2006.01)
*F16K 15/06* (2006.01)

(52) U.S. Cl.
CPC ............ *F04B 53/1087* (2013.01); *F16K 1/42* (2013.01); *F16K 15/063* (2013.01)

(56) References Cited

U.S. PATENT DOCUMENTS

| | | |
|---|---|---|
| 2009/0255504 A1* | 10/2009 | Ogino .................... C23C 24/103 123/193.5 |
| 2011/0239858 A1 | 10/2011 | Slot et al. |
| 2015/0034037 A1 | 2/2015 | Qiao et al. |
| 2015/0144826 A1 | 5/2015 | Bayyouk et al. |
| 2015/0152855 A1 | 6/2015 | Pessin et al. |
| 2016/0018007 A1* | 1/2016 | Eckholz .................. F16K 47/04 251/318 |
| 2016/0311071 A1 | 10/2016 | Dutta |

\* cited by examiner

CLADDED VALVE SEAT, ASSEMBLY, AND METHODS FOR CLADDING SUCH SEAT

CROSS-REFERENCE TO RELATED APPLICATION

This application claims priority to and the benefit of U.S. Provisional Patent Application Ser. No. 62/682,708, filed on Jun. 8, 2018, all of which is incorporated herein by reference in its entirety.

FIELD

This disclosure relates in general to fluid ends for reciprocating pumps and in particular, valve seats therein.

BACKGROUND

Large pumps are commonly used for mining and oilfield applications, such as, for example, hydraulic fracturing. During hydraulic fracturing, fracturing fluid (including, e.g., cement, mud, frac sand, and other materials) is pumped at high pressures into a wellbore to cause the producing formation to fracture. One commonly used pump in hydraulic fracturing is a high pressure reciprocating pump, like the SPM® Destiny™ TWS 2500 frac pump, manufactured by S.P.M. Flow Control, Inc. of Fort Worth, Tex. In operation, the fracturing fluid is caused to flow into and out of a pump fluid chamber as a consequence of the reciprocation of a piston-like plunger respectively moving away from and toward the fluid chamber. As the plunger moves away from the fluid chamber, the pressure inside the chamber decreases, creating a differential pressure across an inlet valve, drawing the fracturing fluid through the inlet valve into the chamber. When the plunger changes direction and begins to move towards the fluid chamber, the pressure inside the chamber substantially increases until the differential pressure across an outlet valve causes the outlet valve to open, enabling the highly pressurized fracturing fluid to discharge through the outlet valve into the wellbore.

Because of extreme operating conditions such as high fluid flow, the high operating pressures (oftentimes up to 15,000 psi) and the abrasive solid particles associated with the fracturing fluid, the mating surfaces on valves and valve seats tend to wear at a rapid rate, and thus, the valves and valve seats must be replaced at frequent intervals.

Field servicing and replacement of valve seats is time consuming and cumbersome. Since valve seats are typically press fitted into the fluid end, specialized equipment, including equipment having complex hydraulic system arrangements, are required to extract the valve seat. Once the seat is extracted, a new seat is positioned inside the fluid end and then pressed in place. This process is typically repeated every 2 to 3 days, however, it is not uncommon for this to occur multiple times in a single day. The frequency of replacement depends on multiple factors including, for example, the fracking media, hours of operation, etc.

If, however, valve seat replacement requirement could be eliminated, significant savings could be realized. These savings would be the result of eliminating of the cost of the component, required labor to conduct field servicing and a significant increase in up time (no down time needed to conduct the servicing of the seats).

SUMMARY

This disclosure provides a valve assembly having cladded surfaces of high hardness in order to improve the service life of valves and valve seats. The cladded surfaces may include various materials of favorable mechanical properties for mitigating failure mechanisms known for common valve seats (e.g., having a common base metal throughout). In one example, the cladded surfaces are created using an additive manufacturing process, such as laser metal deposition. The cladded surfaces offer advantages including metallurgical bonding, localized low heat input at the laser focus (thus enabling accurate control of temperature and mitigating undesirable heat treatment effects), ductility in middle layers for increasing impact resistance, variable cladding thickness (optionally exceeding 1 mm), increased hardness by material and fusing temperature selections, corrosion resistance, modification of mechanical properties of the same selected material, and allowing for sensor embedment.

At a high level, a valve assembly includes a valve seat having a contact surface for receiving a valve; a metal strike surface metal cladded with a layer of fused metal having high hardness properties; a valve guide surface; an external surface for press fitting into a fluid cylinder, wherein the external surface further includes a groove for receiving a sealing member; and an untreated external surface exposing a base metal of the valve seat.

In a first general aspect, a valve seat includes a base supporting a contact surface for receiving a valve. The contact surface includes a metal strike surface cladded with a layer of fused metal having high hardness properties. The valve seat further includes a valve guide surface forming an inner surface in the base and an external surface of the base for press fitting into a fluid cylinder. The external surface further includes a groove for receiving a sealing member. The external surface of the base exposes a base metal of a hardness property less than the high hardness properties of the layer of fused metal of the metal strike surface of the contact surface.

In one specific aspect, the layer of fused metal of the metal strike surface of the contact surface has a hardness no less than 70 HRc.

In another specific aspect, the layer of fused metal of the metal strike surface of the contact surface includes laser melted particles fused on top of the base metal of the base.

In yet another specific aspect, the layer of fused metal of the metal strike surface of the contact surface embeds a sensor.

In one specific aspect, the high hardness properties of the layer of fused metal of the metal strike surface of the contact surface are variable by different selection of fused metals or fusing temperatures.

In another specific aspect, the layer of fused metal of the metal strike surface of the contact surface is machined or polished to provide specific surface texture properties.

In yet another specific aspect, the layer of fused metal of the metal strike surface of the contact surface is a cobalt-chromium alloy having carbon, tungsten, or molybdenum.

In one specific aspect, the layer of fused metal of the metal strike surface of the contact surface extends through the base and forms the valve guide surface.

In a second general aspect, a valve assembly includes a fluid passage; a valve seat sealingly affixed to the fluid passage, the valve seat having a contact surface and a base; and a valve body sealingly engageable with the contact surface of the valve seat at a metal strike surface of the contact surface, the metal strike surface includes a first layer of cladded metal fused on the base of the valve seat, the first layer of cladded metal being more wear resistant than the base.

In one specific aspect, the valve seat further includes a valve guide surface forming an inner surface in the base; and an external surface of the base for press fitting into a fluid cylinder.

In another specific aspect, the external surface further includes a groove for receiving a sealing member, the external surface of the base exposes a base metal of a hardness property less than the high hardness properties of the first layer of cladded metal of the metal strike surface of the contact surface.

In yet another specific aspect, the base metal is more ductile than the first layer of cladded metal.

In one specific aspect, the base metal absorbs vibration and provides reinforcement to the first layer of cladded metal.

In another specific aspect, the metal strike surface further includes a second layer of cladded metal different from the first layer of cladded metal, the second layer of cladded metal is more wear resistant than the first layer of cladded metal.

In yet another specific aspect, the second layer of cladded metal includes tungsten not less than twenty percent by weight.

In a third general aspect, a method is presented for manufacturing a valve seat having a wear resistant contact surface to sealingly engage a valve. The method includes: providing a seat base of a base metal; placing a first layer of powder of a first blend of metal onto the seat base; melting the first layer of powder locally as the first layer of powder is placed onto the seat base; and machining the melted first layer of powder of the first blend of metal to conform to contour and texture requirements for the contact surface.

In one specific aspect, the method further includes placing a second layer of powder of a second blend of metal onto the first layer of powder, the second blend of metal different from the first blend of metal; and melting the second layer of powder locally as the second layer of powder is placed onto the first layer of powder.

In another specific aspect, the second blend of metal includes the first blend of metal and tungsten carbide.

In yet another specific aspect, providing the seat base of the base metal includes preheating the seat base of the base metal to about 400 to 450 degrees Celsius.

In one specific aspect, machining the melted first layer of powder of the first blend of metal includes preserving a thickness of about 0.075 to 0.156 inches of the melted first layer of powder of the first blend of metal.

Other aspects, features, and advantages will become apparent from the following detailed description when taken in conjunction with the accompanying drawings, which are a part of this disclosure and which illustrate, by way of example, principles of the inventions hereof.

DESCRIPTION OF THE FIGURES

The accompanying drawings facilitate an understanding of the various embodiments.

Like numerals refer to like elements.

DETAILED DESCRIPTION

This disclosure presents a valve assembly having composite layers of fused metals deposited onto a base metal. Such fused metal deposition may be referred to as "cladding." In some embodiments, the composite layers of fused metals are deposited using laser metal deposition (hereinafter "laser cladding"), an additive manufacturing process enabling different metal powders to be added onto a base valve seat to achieve specific material composition and mechanical characteristics (e.g., ductility, hardness, toughness, etc.). In other embodiments, cladding may be achieved using other techniques, such as welding. According to some embodiments, a combination of metallic materials, including carbides, are deposited on the ware and impact sensitive areas aiming to increase service life of the valve seat and/or the valve body. A specific combination of different metal elements forming different cladding layers achieves a durable contact surface that exceeds the performance of a single element surface.

Figure 1:
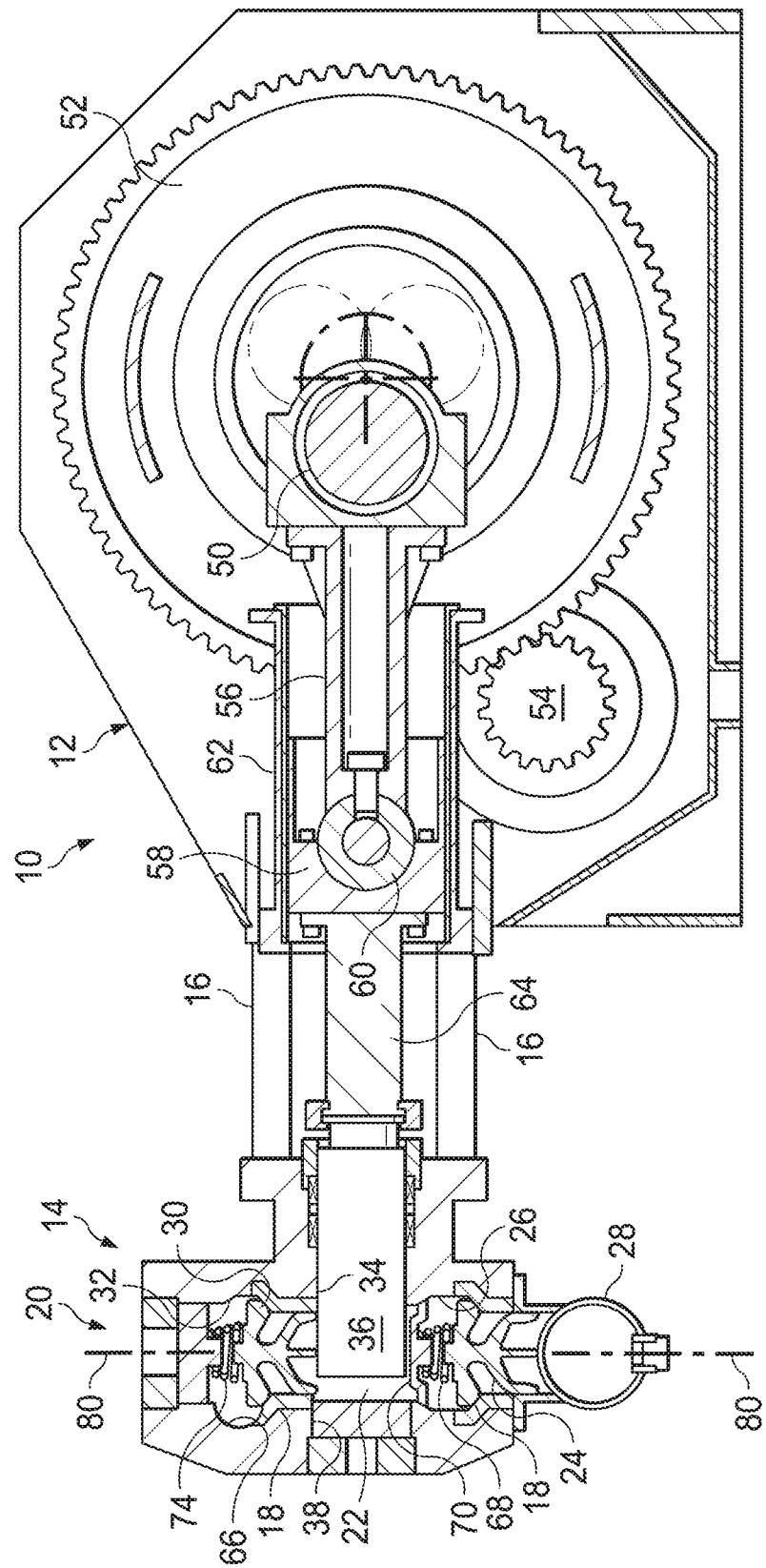
FIG. 1 is a cross sectional side view of a reciprocating pump assembly having a power end coupled to a fluid end incorporating valve assemblies.
Figure 2:
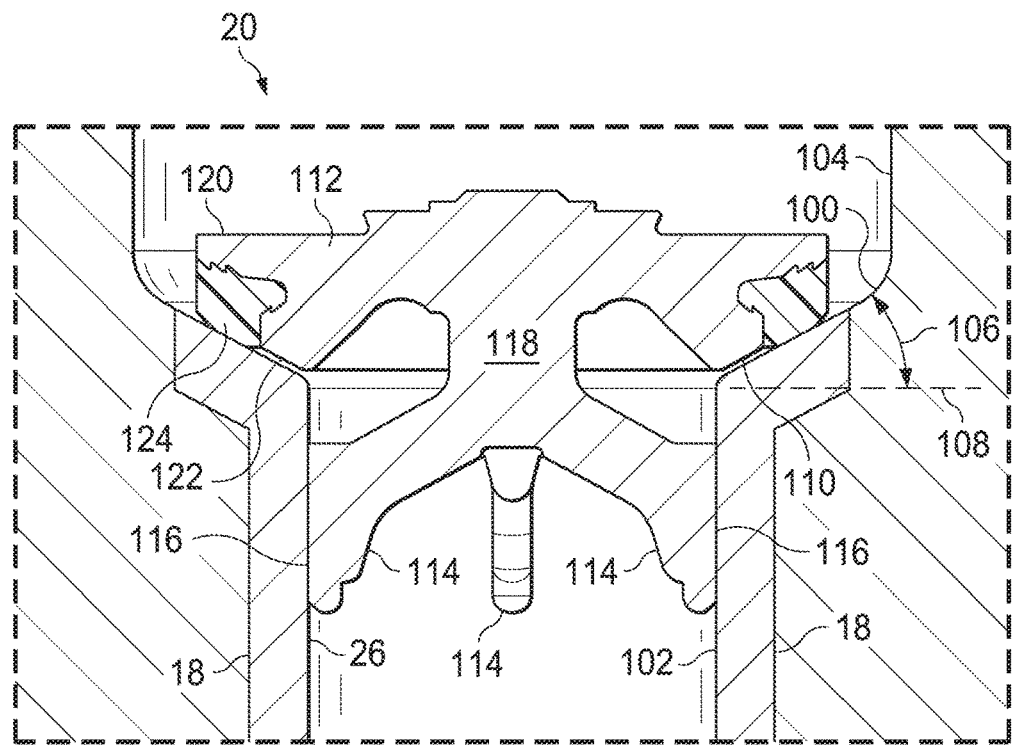
FIG. 2 is a detail view of an embodiment of a valve assembly of FIG. 1 illustrating the valve body and a valve seat.

FIG. 1 is an illustration of a reciprocating pump assembly 10 having a crankshaft housing 12 operatively coupled to a fluid section 14 via a plurality of stay rods 16, the assembly 10 effective to pump fluid through a fluid end housing 20. In the embodiment illustrated in FIG. 1, the fluid section 14 is employs one or more valve seats 18 (i.e., a valve seat sealingly inserted into the fluid end housing 20), which as discussed in further detail below, are operable to eliminate the need for a removable valve seat. FIG. 2 is a detail view of an embodiment of a valve assembly of FIG. 1 showing the relationship between the valve 30 and the valve seat 18. Details of the valve seat 18 are further discussed below with reference to FIG. 3.

Referring first to FIGS. 1 and 2, the fluid end housing 20 includes one or more fluid chambers 22 (only one shown). In particular, the fluid end housing 20 typically includes a suction valve 24 in a suction bore 26 that draws fluid from within a suction manifold 28, a discharge valve 30 in a discharge bore 32 to control fluid output, a plunger bore 34 for housing a reciprocating plunger 36, and an access bore 38 to enable or otherwise facilitate access to the plunger bore 34. Such fluid end housings 20 are designed so that the suction valve bore 26, the discharge valve bore 32, the plunger bore 34 and the access bore 38 generally intersect in the vicinity of the fluid chamber 22.

In the embodiment illustrated in FIG. 1, the pump assembly 10 is positionable to be free-standing on the ground, mounted to a trailer that can be towed between operational sites, and/or mounted, for example, to a skid for use in offshore operations. Referring specifically to the crankshaft housing 12, a crankshaft 50 is rotated by a bull gear 52, which is engaged with and driven by a pinion gear 54. A power source, such as an engine (not shown), connects to and rotates the pinion gear 54 during operation. A connecting rod 56 mechanically connects the crankshaft 50 to a cross head 58 via a wrist pin 60. The crosshead 58 is mounted within a stationary crosshead housing 62, which constrains the crosshead 58 to linear reciprocating movement. A pony rod 64 connects to the crosshead 58 and has its opposite end connected to the plunger 36 to enable reciprocating movement of the plunger 36, as discussed in further detail below. In the embodiment illustrated in FIG. 1, the plunger 36 may be one of a plurality of plungers, such as, for example, three or five plungers, depending on the size of the pump assembly 10 (i.e., three cylinder, five cylinder, etc.).

As illustrated in FIG. 1, the plunger 36 extends through the plunger bore 34 so as to interface and otherwise move within the fluid chamber 22. In operation, the valves 24 and 30 are actuated by a predetermined differential pressure inside the fluid chamber 22. The suction valve 24 actuates to control fluid flow through the suction manifold 28 into the fluid chamber 22, and the discharge valve 30 actuates to control fluid flow through a discharge port 66 from the fluid chamber 22. In particular, movement of the crankshaft 50 causes the plunger 36 to reciprocate or move longitudinally toward and away from, the fluid chamber 22. As the plunger 36 moves longitudinally away from the chamber 22, the pressure of the fluid inside the fluid chamber 22 decreases, which creates a differential pressure across the suction valve 24.

In the embodiment illustrated in FIG. 1, a biasing member 68 (e.g., a spring) is located between the suction valve 24 and a valve stop 70. The biasing member 68 maintains a predetermined pressure on the suction valve 24 thereby maintaining the suction valve 24 in a closed position until the differential pressure across suction valve 24 is sufficient to overcome the force generated by the biasing member 68. The pressure differential within the chamber 22 enables actuation of the valve 24 to allow the fluid to enter the chamber 22 from the suction manifold 28. The pumped fluid is drawn within the fluid chamber 22 as the plunger 36 continues to move longitudinally away from fluid chamber 22 until the pressure difference between the fluid inside the chamber 22 and the fluid pressure inside the suction manifold 28 is small enough for the suction valve 24 to move to its closed position (via the biasing mechanism 68 and/or pressure within the chamber 22). As the plunger 36 changes directions and moves longitudinally toward the fluid chamber 22, the fluid pressure inside the chamber 22 gradually increases. Fluid pressure inside the chamber 22 continues to increase as the plunger 36 approaches the end of its cycle (i.e., the top dead center) until the differential pressure across the discharge valve 30 is large enough to actuate the valve 30 (thereby compressing a biasing member 74). This enables pumping fluid to exit the chamber 22 via the discharge port 66.

Briefly, in the embodiment illustrated in FIG. 1, the fluid end housing 20 includes the suction valve bore 26 and the discharge valve bore 32 aligned along a centerline or axis 80. For ease of explanation, the following discussion will refer to the suction valve 24 and the suction valve bore 26; however, it should be understood that a similar structure and the same principles apply to the discharge valve 30 and the discharge valve bore 32. Referring specifically to the suction valve bore 26 in FIG. 2, the suction valve bore 26 has an inclined/conical seating surface 100 that extends from an inner wall portion 102 to an outer wall portion 104.

In the embodiment illustrated in FIG. 2, the conical contour of seating surface 100 is disposed at an angle 106, which is relative to a plane 108 that is perpendicular to the central axis 80, and which in the embodiment shown also corresponds to the angle of an engagement surface 110 on the valve member 112. The angle 106 is provided preferably in one embodiment from about 20 degrees to about 60 degrees. In other embodiments, the angle 106 is from about 30 degrees to about 40 degrees, from about 30 degrees to about 35 degrees, from about 35 degrees to about 45 degrees, from about 35 degrees to about 40 degrees, from about 40 degrees to about 45 degrees, greater than 30 degrees, or less than 45 degrees; however, the range of the angle 106 may vary. In some embodiments, the seating surface 100 is formed of a hardened steel to eliminate and/or otherwise substantially reduce damage (i.e., general wear and pitting) caused from abrasive solid particles associated with the fracturing fluid and the high operating pressures and fluid flow.

With continued reference to FIG. 2, the suction valve 24 comprises the seating surface 100 of the suction bore 26 and the valve member 112. According to some embodiments, the valve member 112 is formed of metal such as cast steel, is reciprocatably movable between an open position (i.e., the valve member 112 is spaced apart from the seating surface 100), and a closed position (i.e., the valve member 112 mates with and otherwise engages the seating surface 100) in response to differential pressure within the pump. In the embodiment illustrated in FIG. 2, the valve member 112 includes three legs 114 having outer ends 116 slideably engaging the inner sidewall 102 of the suction bore 26. The legs 114 are secured to or otherwise integral with a central stem 118. The central stem 118 extends upwardly along the central axis 80 to an upper valve body portion 120.

In the embodiment illustrated in FIG. 1, an upper valve body portion 120 flares radially outward from the stem 118 and forms the downwardly and outwardly-facing annular seal/engagement surface 110. In the embodiment illustrated in FIG. 2, the valve body portion includes a seal insert 124 for sealingly engaging the inclined seating surface 100. According to some embodiments, the seal insert 124 is formed of a conventional thermoplastic material including, for example, urethane. This particular configuration of the sealing surface 100 extending between the inner and outer surfaces 102 and 104 enables the fluid end housing to be operable without requiring a detachable/removable valve assembly.

Figure 3:
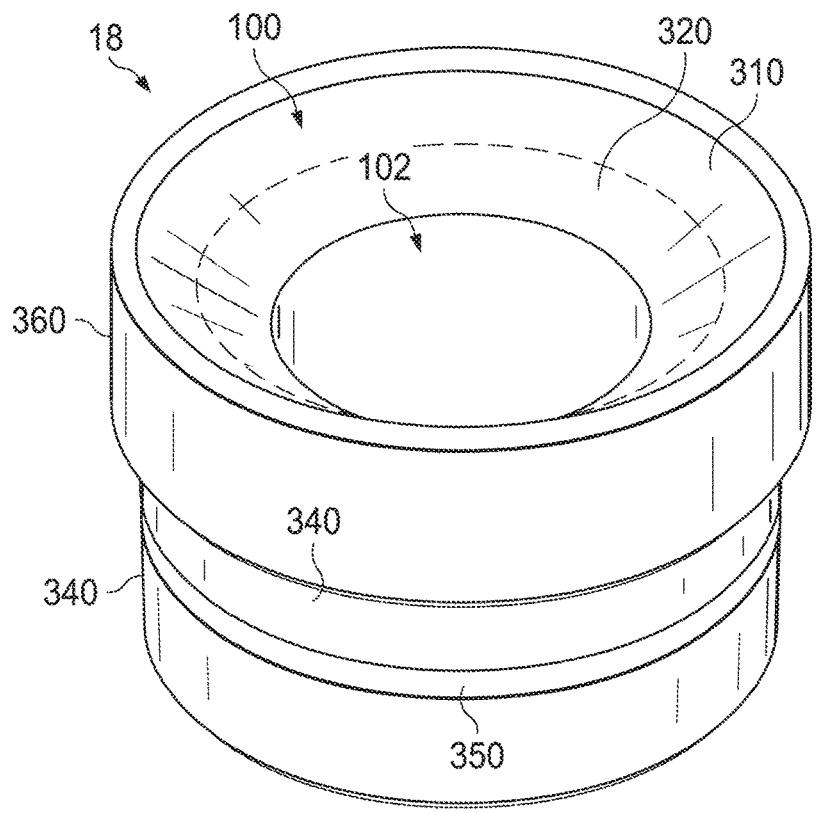
FIG. 3 is a perspective view of a valve seat embodiment incorporating cladding surfaces.

FIG. 3 is a perspective view of an embodiment of a valve seat 18 having laser cladding surfaces. The valve seat 18 includes the engagement surface 100 as previously discussed in relation to FIG. 2. The engagement surface 100 includes two areas: the valve contact surface 310 and the valve strike surface 320. The valve strike surface 320 experiences greater impact during operation and is thus under greater stresses than the valve contact surface 310. According to some embodiments, the valve strike surface 320 has a hardness of at least 70 HRC in Rockwell scale. By comparison, the contact surface 310 can have a harness of about 62 HRC. The greater hardness of the strike surface 320 can reduce material wear during operation and thus enables a longer service life for the valve seat 18. In some embodiments, however, the strike surface 320 may be part of the contact surface 310.

The proportion of the contact surface 310 and the strike surface 320 corresponds to specific designs of the discharge valve 30. In some embodiments, the contact surface 310 may be manufactured the same as the strike surface 320 for machining efficiency or other considerations. In other embodiments, the contact surface 310 may be distinct from the strike surface 320 for cost considerations. In the examples shown in FIGS. 4A and 4B, the contact surface 310 and the strike surface 320 are made of a common reinforcement structure. However, in other embodiments, the materials used in these two surfaces 310 and 320 may be different, for example, the contact surface 310 may use the base metal material without laser cladding. Other configurations are possible for serving this purpose.

The inner wall portion 102 of the valve seat 18 may also be treated with laser cladding. The hardness requirement of this inner wall portion 102 is less than that of the strike surface 320 because it experiences primarily sliding forces. For example, in some embodiments, the inner wall portion 102 has a hardness greater than 62 HRC for good performance of the valve seat 18. Due to manufacturing considerations, such as surface quality and machining efficiency, the inner wall portion 102 may have the same laser cladding treatment as the engagement surface, as provided in the example embodiment of FIG. 4A. Due to cost considerations, however, the wall portion 102 may remain untreated, such as in the example embodiment of FIG. 4B. Other configurations are possible for achieving a balance between performance and cost.

The valve seat 18 further includes an external surface 340 for press fitting into a fluid cylinder in the fluid end housing 20. The external surface 340 has a hardness level of at least 58 HRC. In some embodiments, the base metal of the valve seat 18 has a hardness level satisfying the requirement of the external surface 340. In other embodiments, the hardness may be achieved using various heat treatment methods to increase the surface hardness of the base metal of the valve seat 18. The external surface 340 includes at least one groove 350 for placement of a sealing member for sealing the valve seat 18 against the fluid cylinder in the fluid end housing 20. For example, the groove 350 is configured to receive an O ring made of a flexible material. The groove 350 may be left untreated to have the mechanical properties of the base metal of the valve seat 18.

Figure 4A:
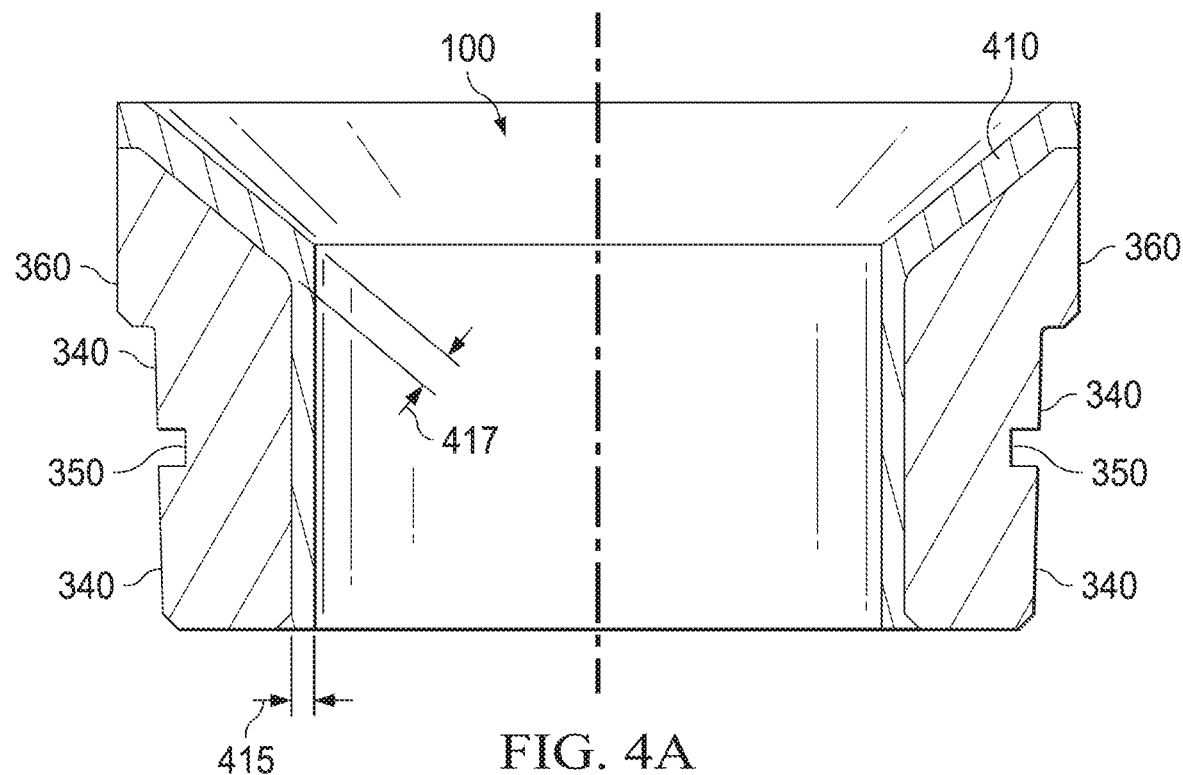
FIGS. 4A and 4B are cross sectional views of two example valve seats treated with cladding.
Figure 4B:
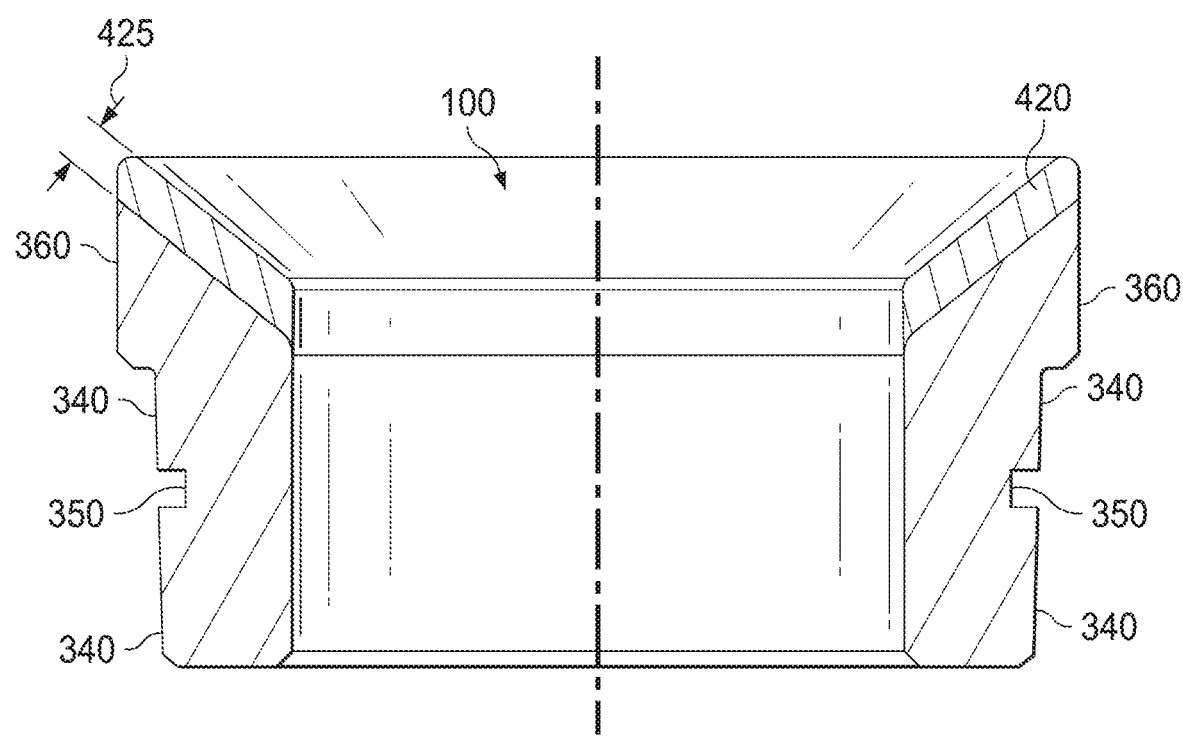

FIGS. 4A and 4B are cross sectional views of two examples of the valve seat 18 treated with laser cladding. Turning first to FIG. 4A, the valve seat 18 includes a fused metal layer 410 that provides for the seating surface 100 and the inner wall portion 102. The fused metal layer 410 includes a first thickness 415 that protects the inner wall portion 102 and a second thickness 417 that protects the contact surface 310 and the strike surface 320. Examples of the material composition of the fused metal layer 410 are provided in FIGS. 5 and 6 and their corresponding detailed description. In some embodiments, the first thickness 415 is 0.1" or 2.54 mm thick. The second thickness 417 is 0.156" or 4 mm thick; however, it should be understood that a different thickness may be utilized depending on the operating conditions.

In FIG. 4B, a different fused metal layer 420 provides for the seating surface 100 and does not cover the inner wall portion 102. The fused metal layer 420 has an overall thickness 425. In some embodiments, the thickness 425 is 0.2" or 5 mm thick; however, it should be understood that a different thickness may be utilized depending on the operating conditions. Similar to the fused metal layer 410, detail examples of the material composition as well as the manufacturing methods are provided in FIGS. 5-7. Although the fused metal layers 410 and 420 are illustrated as distinct layers having clear separation from the base metal of the valve seat 18, in practice the fused metal layers 410 and 420 may be fused with the base metal of the valve seat 18 in a manner that a gradual transition between two or more materials is achieved (i.e., a distinct separation surface is not intentionally made separating the fused metal layer from the base metal of the valve seat 18). In some embodiments, the net hardness depth may be about 0.156" or 4 mm deep in finished condition (i.e., after machining, polishing, grinding, sanding, or otherwise achieving the desired final surface texture or smoothness). In other embodiments, the net hardness depth may be less than 0.156" but no less than about 0.078" or 2 mm deep.

Figure 5A:
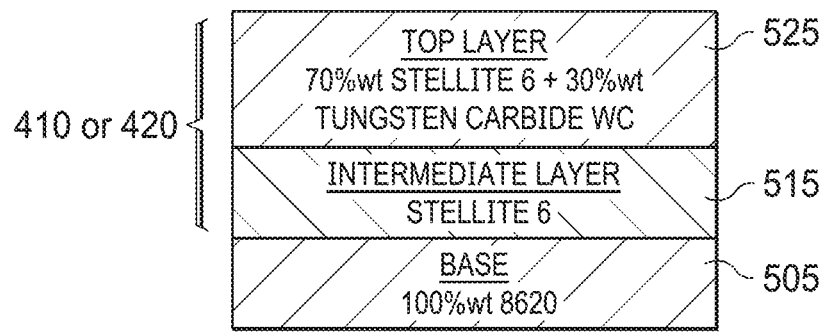
FIGS. 5A, 5B, and 5C illustrate examples of material composition for the cladding used in FIGS. 4A and 4B.
Figure 5B:
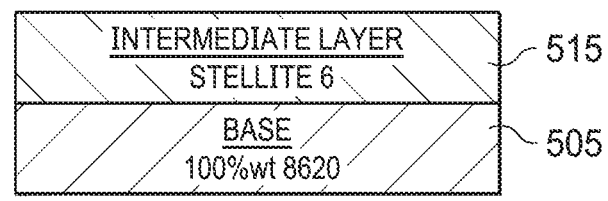
Figure 5C:
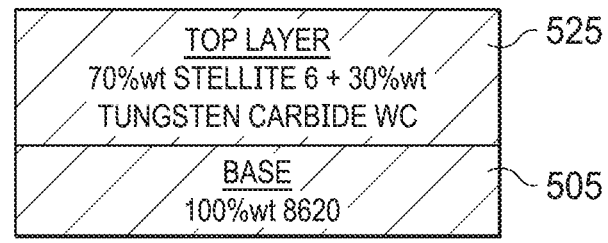

FIGS. 5A, 5B, and 5C illustrate examples of material composition for the cladding used in FIGS. 4A and 4B. Referring first to FIG. 5A, the valve seat 18 includes a base metal 505, such as 100% 8620 steel. In some embodiments, however, the base metal 505 may include other metal elements other than the 8620 steel. According to some embodiments, the base metal 505 has a general hardness of about 61 HRC (the hardness may be heat treated to vary). The fused metal layer 410 or 420 may include two or more layers of different fused metals. In the embodiment illustrated in FIG. 5A, an intermediate layer 515 may be deposited on top of the base metal 505. The intermediate layer 515 may be made of a first metal alloy including cobalt, chromium, nickel, iron, boron, carbon, aluminum, molybdenum, titanium, and others. In one example, the first metal alloy may be the STELLITE® 6 alloy. The first metal alloy has high wear resistance and ductility and low hardness value (about 36-45 HRC).

The intermediate layer 515 provides a bonding medium between the top layer 525 and the base material 505 and increases the overall toughness of the fused metal layer 410 or 420. The top layer 525 can be made with fused metal powers of about 70% first metal alloy and about 30% tungsten carbide. In other embodiments, the top layer 525 may include fused metal powers of about 40% first metal alloy and about 60% tungsten carbide. Other proportions by weight of different metal powders or blends may vary. For example, the percentage of tungsten carbide may vary between 30% and 60% (or a different range for achieving specific or tailored hardness and wear-resistance), while the first metal alloy makes up the remaining percentage. Such tailored top layer 525 of different metals may provide high hardness as well as strong wear resistance. In the current embodiments, the average hardness of the top layer 525 is at least 72 HRC.

As shown in FIGS. 5B and 5C, in some embodiments, either of the intermediate layer 515 or the top layer 525 by itself may be the sole layer cladded onto the base metal 505. Such single-layer embodiments may be used when production costs, sizes, and other manufacturing concerns are considered. Even with a layer of a same alloy composition, different thickness may be achieved and the advantages of strong wear resistance and high impact toughness may still be available in such configurations. Although FIGS. 5B and 5C illustrate using the intermediate layer 515 and top layer 525 as the sole layer cladded onto the base metal 505, the intermediate layer 515 and the top layer 525 may include different materials or element other than those shown in FIG. 5A. For example, the intermediate layer 515 may include a blend of metal other than STELLITE® 6. Similarly, the top layer 525 may also include a blend of metal other than the first metal alloy and tungsten carbide.

Figure 6:
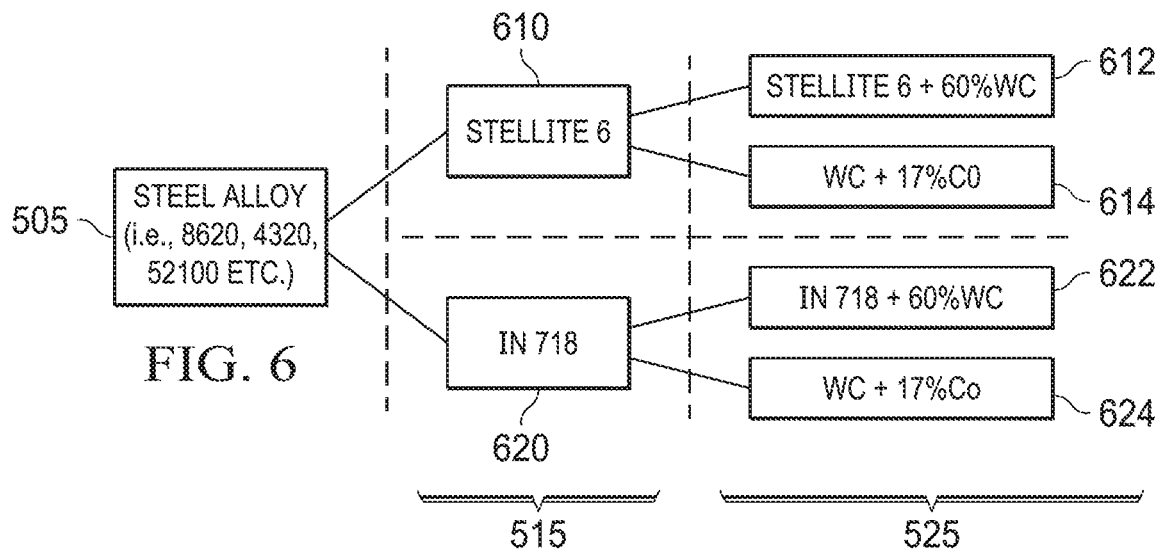
FIG. 6 illustrates an example of material composition options for the cladding used in FIGS. 4A and 4B.

FIG. 6 illustrates another example of material composition options for the laser cladding used in FIGS. 4A and 4B. As shown in FIG. 6, different combination of materials can be used to form the intermediate layer 515 and the top layer 525. For example, the top layer 525 may be about 83% tungsten carbide and 17% cobalt. In another embodiment, the intermediate layer 515 may be the Inconel alloy 718. Correspondingly, the top layer 525 may be about 40% of Inconel alloy 718 and 60% tungsten carbide; or alternatively, the top layer 525 may be about 83% tungsten carbide and 17% cobalt. In other embodiments, different types of elements other than illustrated may be used in the material composition in different proportions.

Figure 7:
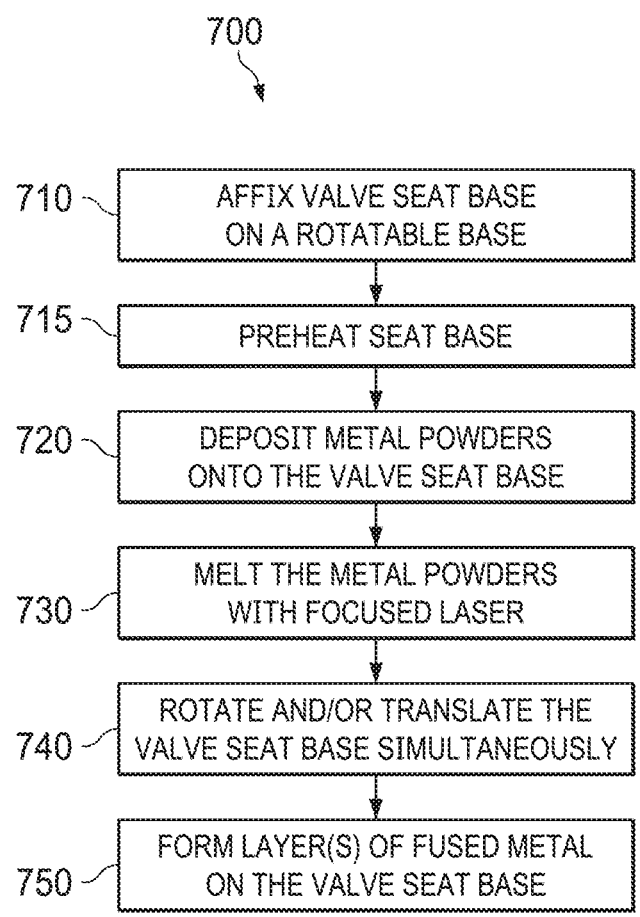
FIG. 7 is a flowchart illustrating the method for making the cladding layers in the valve seat of FIG. 3.

FIG. 7 is a flowchart 700 illustrating the method for making the laser cladding layers 410 or 420 in the valve seat 18 of FIG. 3. At step 710, the base metal of the valve seat 18 is affixed onto a rotatable base, which has, for example, at least two degrees of rotational freedom so that the laser cladding point may be fixed during deposition. In other embodiments, however, the base metal of the valve seat 18 may be secured onto a non-moving platform, while a mechanical arm actuating and moving the tool that provides the laser cladding point is used to perform metal cladding around the base metal of the valve seat 18.

After the valve seat 18 has been secured, at step 715, the base metal of the valve seat 18 may be preheated to a high temperature, such as about 400 to 450 degrees Celsius. In some embodiments, the preheating of the base metal of the valve seat 18 depends on the metal powder blends used in cladding. For example, some metal powder blends may require the base metal to be at similar temperatures during deposition to avoid undesired shrinkage or even cracking upon cooling and/or any undesired stress associated with the temperature differences. In some embodiments, the preheating may be applied locally or throughout the valve seat 18. In yet some other embodiments, the preheating step 715 may include multiple stages for heat treating different locations of the valve seat 18.

At step 720, metal powders corresponding to the desired material composition is deposited onto the base material of the valve seat 18. The delivery of the metal powders may be achieved via gravity or airflow or other delivery methods (such as statics or magnetic forces). During the delivery of the metal powders, at step 730, a focused laser beam is applied to the traveling powders in order to melt the solid powders into liquid state. The liquid state metal powders are then fused onto the base metal of the valve seat 18 and onto each other, forming a molten layer of metal, which soon cools down and solidifies.

During the deposition of the metal powders and fusing operation at steps 720 and 730, the valve seat 18 is rotated to feed the fused metal layer onto desired locations in specified orientations at step 740. For example, the fused metal layer may be deposited along the radial direction of the valve seat. Finally at step 750, layers of fused metal are deposited in sequences to form complete coverage layer. In some embodiments, multi-level or multiple layers may be deposited and fused on top one another by repeating the steps 720 through 740, such as the example shown in FIG. 5A. In some embodiments, after fusing the top layer 525, an additional machining process may be included to machine the fused metal layer into desired surface quality. The machining process may include cutting, turning, milling, grinding, sanding, polishing, and other steps. In other embodiments, the resolution of the fused metal deposition can be adjusted such that the desired surface quality is achieved initially during laser cladding.

Furthermore, while in certain embodiments, valve assemblies have been described herein to operate in conjunction with reciprocating pumps in the presence of highly abrasive fluids, such as fracturing fluids, it is to be understood that many other applications for said valve assemblies lie within the scope of the invention. For example, the valve assemblies can be used in pumps pumping drilling fluid directly into the well bore, mining slurry through a pipeline, in pumps that are used to plump fluid with fluid particulars, or in applications other than pumps.

In the foregoing description of certain embodiments, specific terminology has been resorted to for the sake of clarity. However, the disclosure is not intended to be limited to the specific terms so selected, and it is to be understood that each specific term includes other technical equivalents which operate in a similar manner to accomplish a similar technical purpose.

In the specification and claims, the word "comprising" is to be understood in its "open" sense, that is, in the sense of "including", and thus not limited to its "closed" sense, that is the sense of "consisting only of". A corresponding meaning is to be attributed to the corresponding words "comprise", "comprised" and "comprises" where they appear.

In addition, the foregoing describes only some embodiments of the invention(s), and alterations, modifications, additions and/or changes can be made thereto without departing from the scope and spirit of the disclosed embodiments, the embodiments being illustrative and not restrictive.

Furthermore, invention(s) have described in connection with what are presently considered to be the most practical and preferred embodiments, it is to be understood that the invention is not to be limited to the disclosed embodiments, but on the contrary, is intended to cover various modifications and equivalent arrangements included within the spirit and scope of the invention(s), as defined solely by the appended claims. Also, the various embodiments described above may be implemented in conjunction with other embodiments, e.g., aspects of one embodiment may be combined with aspects of another embodiment to realize yet other embodiments. Further, each independent feature or component of any given assembly may constitute an additional embodiment.

What is claimed is:

1. A valve seat comprising:
   a base supporting an engagement surface for receiving a valve, wherein the engagement surface includes a metal strike surface configured to engage with a metal surface of the valve and a contact surface configured to sealingly engage with a non-metal surface of the valve;
   a valve guide surface forming an inner surface in the base; and
   an external surface of the base for press fitting into a fluid cylinder;
   wherein the metal strike surface and the contact surface are cladded with a layer of fused metal disposed over and overlaying the entire engagement surface; and
   wherein the external surface of the base exposes a base metal having a hardness less than a hardness of the layer of fused metal of the metal strike surface.

2. The valve seat of claim 1, wherein the layer of fused metal of the metal strike surface of the engagement surface has a hardness no less than 62 HRc.

3. The valve seat of claim 1, wherein the layer of fused metal of the metal strike surface of the engagement surface comprises laser melted particles fused on top of the base metal of the base.

4. The valve seat of claim 1, wherein the layer of fused metal of the metal strike surface of the engagement surface embeds a sensor.

5. The valve seat of claim 1, wherein the hardness of the layer of fused metal of the metal strike surface of the engagement surface is variable through the selection of fused metal or fusing temperature.

6. The valve seat of claim 1, wherein the layer of fused metal of the metal strike surface of the engagement surface is machined or polished to provide a specific surface texture.

7. The valve seat of claim 1, wherein the layer of fused metal of the metal strike surface of the engagement surface is a cobalt-chromium alloy having carbon, tungsten, or molybdenum.

8. The valve seat of claim 1, wherein the layer of fused metal of the metal strike surface of the engagement surface extends through the base and forms the valve guide surface.

9. A valve assembly comprising:
a fluid passage;
a valve seat sealingly affixed to the fluid passage, the valve seat having an engagement surface and a base; and
a valve body sealingly engageable with the engagement surface of the valve seat at a metal strike surface of the engagement surface and a contact surface of the engagement surface, wherein the engagement surface comprises a first layer of cladded metal fused on the base of the valve seat and overlaying the entire engagement surface, the first layer of cladded metal being more wear resistant than a base metal of the base, and wherein an external surface of the base exposes the base metal.

10. The valve assembly of claim 9, wherein the valve seat further comprises a valve guide surface forming an inner surface in the base; and the external surface of the base is configured for press fitting into a fluid cylinder.

11. The valve assembly of claim 10, wherein the external surface further includes a groove for receiving a sealing member, wherein the base metal has a hardness less than a hardness of the first layer of cladded metal of the metal strike surface of the engagement surface.

12. The valve assembly of claim 11, wherein the base metal is more ductile than the first layer of cladded metal.

13. The valve assembly of claim 12, wherein the base metal absorbs vibration and provides reinforcement to the first layer of cladded metal.

14. The valve assembly of claim 13, wherein the engagement surface further comprises a second layer of cladded metal different from the first layer of cladded metal, wherein the second layer of cladded metal is more wear resistant than the first layer of cladded metal.

15. The valve assembly of claim 14, wherein the second layer of cladded metal comprises tungsten not less than twenty percent by weight.

16. The valve assembly of claim 9, wherein the entirety of the external surface of the base exposes the base metal.

17. A method for manufacturing a valve seat having a wear resistant contact surface to sealingly engage a valve, the method comprising:
providing a seat base of a base metal;
depositing a first layer of powder of a first blend of metal onto the seat base;
melting the first layer of powder locally as the first layer of powder is deposited onto and overlaying at least a portion of the seat base;
machining the melted first layer of powder of the first blend of metal to conform to contour and texture requirements for the contact surface;
depositing a second layer of powder of a second blend of metal onto the first layer of powder, the second blend of metal different from the first blend of metal; and
melting the second layer of powder locally as the second layer of powder is deposited onto the first layer of powder.

18. The method of claim 17, wherein the second blend of metal includes the first blend of metal and tungsten carbide.

19. The method of claim 17, wherein providing the seat base of the base metal comprises preheating the seat base of the base metal to about 400 to 450 degrees Celsius.

20. The method of claim 17, wherein machining the melted first layer of powder of the first blend of metal comprises preserving a thickness of about 0.075 to 0.156 inches of the melted first layer of powder of the first blend of metal.

21. The method of claim 16, further comprising machining the melted second layer of powder of the second blend of metal to conform to contour and texture requirements for the contact surface.

22. A method for manufacturing a valve seat having an engagement surface, the method comprising:
depositing, onto a seat base of a base metal, a first layer of powder of a first blend of metal; melting the first layer of powder locally as the first layer of powder is deposited onto the seat base to form a fused metal layer overlaying the entire engagement surface of the seat base while leaving the base metal of an external surface of the seat base exposed; and
conforming the engagement surface to contour and texture requirements,
wherein the engagement surface includes a metal strike surface configured to engage with a metal surface of the valve and a contact surface configured to sealingly engage with a non-metal surface of the valve.

23. The method of claim 22, further wherein conforming the engagement surface to contour and texture requirements includes performing at least one of (a) adjusting a deposition resolution as the first layer of powder of the first metal blend is deposited onto the seat base or (b) machining the fused metal layer.

24. The method of claim 22, wherein leaving the base metal of the external surface of the seat base exposed comprises leaving the entirety of the base metal of the external surface of the seat base exposed.

* * * * *